(12) United States Patent
Ko

(10) Patent No.: US 7,967,870 B2
(45) Date of Patent: Jun. 28, 2011

(54) DEVICE FOR RETRIEVING DATA FROM A RADIO FREQUENCY IDENTIFICATION TAG

(75) Inventor: Chien-Ho Ko, Changhua County (TW)

(73) Assignee: Da-Yeh University, Changhua County (TW)

( * ) Notice: Subject to any disclaimer, the term of this patent is extended or adjusted under 35 U.S.C. 154(b) by 0 days.

(21) Appl. No.: 12/068,852

(22) Filed: Feb. 12, 2008

(65) Prior Publication Data

US 2010/0241273 A1 Sep. 23, 2010

(30) Foreign Application Priority Data

Jul. 19, 2007 (TW) .............................. 96211789 U

(51) Int. Cl.
*G06F 19/00* (2006.01)
*H04Q 5/22* (2006.01)

(52) U.S. Cl. .................... 901/1; 901/2; 901/8; 235/487; 235/435; 180/167

(58) Field of Classification Search .................. 700/245; 340/10.1; 901/1, 2, 14, 8, 46; 341/1; 235/487, 235/435, 440, 462.01, 462.02; 180/167
See application file for complete search history.

(56) References Cited

U.S. PATENT DOCUMENTS

| | | | | |
|---|---|---|---|---|
| 3,241,687 A * | 3/1966 | Orloff | ................. | 414/5 |
| 3,880,304 A * | 4/1975 | Strickland, Jr. | ............... | 414/694 |
| 5,350,033 A * | 9/1994 | Kraft | ............... | 180/167 |
| 5,443,354 A * | 8/1995 | Stone et al. | ................... | 414/729 |
| 5,625,967 A * | 5/1997 | Kulle | ............... | 37/443 |
| 7,100,424 B2 * | 9/2006 | Wilson | ........................ | 73/31.05 |
| 7,188,513 B2 * | 3/2007 | Wilson | ........................ | 73/31.05 |
| 7,324,921 B2 * | 1/2008 | Sugahara et al. | ............. | 702/183 |
| 7,591,630 B2 * | 9/2009 | Lert, Jr. | ......................... | 414/807 |
| 2009/0223355 A1 * | 9/2009 | Manders | ........................ | 89/1.13 |

* cited by examiner

*Primary Examiner* — Ronnie Mancho
(74) *Attorney, Agent, or Firm* — CKC & Partners Co., Ltd.

(57) ABSTRACT

A device for retrieving data from radio frequency identification (RFID) tags is disclosed. The device includes a mobile base, a robotic arm, and a data reading device. The robotic arm is attached to the mobile base. The data reading device employed to collect the data of electric tags is attached to the end of the robotic arm. A device for retrieving data from an RFID tag arrives at the position, where the electric tag is, by moving the mobile base and adjusting the height of the robotic arm. The movement is controlled according to the position and the height of the electric tag. Finally, the data reading device reads the data stored in the electric tag.

14 Claims, 4 Drawing Sheets

US 7,967,870 B2

DEVICE FOR RETRIEVING DATA FROM A RADIO FREQUENCY IDENTIFICATION TAG

RELATED APPLICATIONS

This application claims priority to Taiwan Application Serial Number 96211789, filed Jul. 19, 2007, which is herein incorporated by reference.

BACKGROUND

1. Field of Invention

The present invention relates to a mobile device having a robotic arm. More particularly, the present invention relates to a device with a robotic arm to retrieve data from radio frequency identification (RFID) tags.

2. Description of Related Art

A radio frequency identification (RFID) system is an automatic identification system, which relies on radio waves to store and retrieve data remotely. Generally speaking, the RFID system contains an RFID tag (i.e. an electronic tag) and a reader. The RFID tag is an object that can be applied to or incorporated into a product, the body of an animal, or the body of a human for the purposes of identification using radio waves to communicate between the tag and the reader.

Most electronic tags contain at least two parts. One is an integrated circuit for storing and processing information, modulating and demodulating an (RF) signal, and can also be used for other specialized functions. The second is an antenna for receiving and transmitting the signal.

RFID tags are divided into two general varieties: passive or active. Passive tags require no internal power supply. They are worked or operated only when a reader is nearby to power them. Passive tags have an operational reading distance ranging from about 10 cm up to a few meters relative to the reader, depending on the chosen radio frequency and antenna design/size.

Active tags require a power source, usually a small battery. Many active tags today have an operational reading range of hundreds of meters. Active tags typically have much longer distance range (approximately 500 m) than passive tags. However, passive tags are extensively applied to a variety of occasions because of their lower cost. Moreover, a fixed reader could retrieve data of passive tags within the operational reading distances range. However, if many fixed readers are installed to cover the whole range the cost increases.

The operational reading distances of RFID tags are limited by surrounding metal interference and communicational direction limitation so the effective operational reading distance is smaller than the distance in theory, which increases the difficulty to retrieve data.

The purpose of the RFID system is to provide a periodical check of goods, for example to take inventory of goods in a warehouse. In addition to wasting time, manually retrieving RFID data also misses tags easily. Moreover, if the RFID tags are installed too high or too low, the difficulty of retrieving data is increased. The risk will be increased when some goods with RFID tags are placed in dangerous areas (such as high temperature, radiation and so on),

SUMMARY

An object of the present invention is to provide a device for retrieving data from RFID tags to overcome the problem of manually retrieving RFID data.

In accordance with the foregoing and other objectives, the present invention provides the device for retrieving data from RFID tags. The device includes a mobile base, a robotic arm and a data reading device.

The device moves to the position of the RFID tags automatically using a mobile base and adjusts to the height of RFID tags with a robotic arm according to where the RFID tags are. The movement depends on the position and the height of the RFID tags. Finally, the reading device retrieves the data stored in the RFID tags.

According to an embodiment of the present invention, the mobile base includes a rotating platform, which could rotate 360 degrees. The mobile base could be a programmable mobile device comprising a microcomputer device, an electrical energy storage device and a driving device. The microcomputer device controls the programmable mobile device, the rotating platform, the robotic arm and the data reading device to work. The electrical energy storage device is connected to the programmable mobile device, the robotic arm device and the data reading device electrically and provides them power. The driving device includes a first driving motor and a second driving motor, which outputs—power through a transmission mechanism.

The robotic arm includes a mounting base and an arm device. The mounting base is mounted on the mobile base. The arm device is engaged with the mounting base and is driven by a first rotating device to adjust the height of the robotic arm. The arm device also includes a second rotating device.

The data reading device is set on the second rotating device of the arm device. The second rotating device adjusts the angle of the reading device to gain stronger signal strength when the reading device is retrieving data from RFID tags.

According to the aforementioned devices and embodiments, the present invention has advantages as follows.

1. Only one handheld reader is needed, and therefore prevents setting too many fixed readers. It could reduce the cost of building equipment and increase the read distance range especially for large-scale operational areas.

2. The device is set to work automatically so it could work after everyone has gone home after work and hence save the time and cost of retrieving data using manpower.

3. The device does not lose any RFID tags wherever the position and the height of RFID tags may be. When RFID tags cannot be retrieved data and show errors occur and the device could send messages to the management system. An administrator's responses will depend on the situation.

4. The device could work in dangerous areas such as high-temperature, explosion, radiation, collapse, high-altitude operation, fall and so on to prevent accidents.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
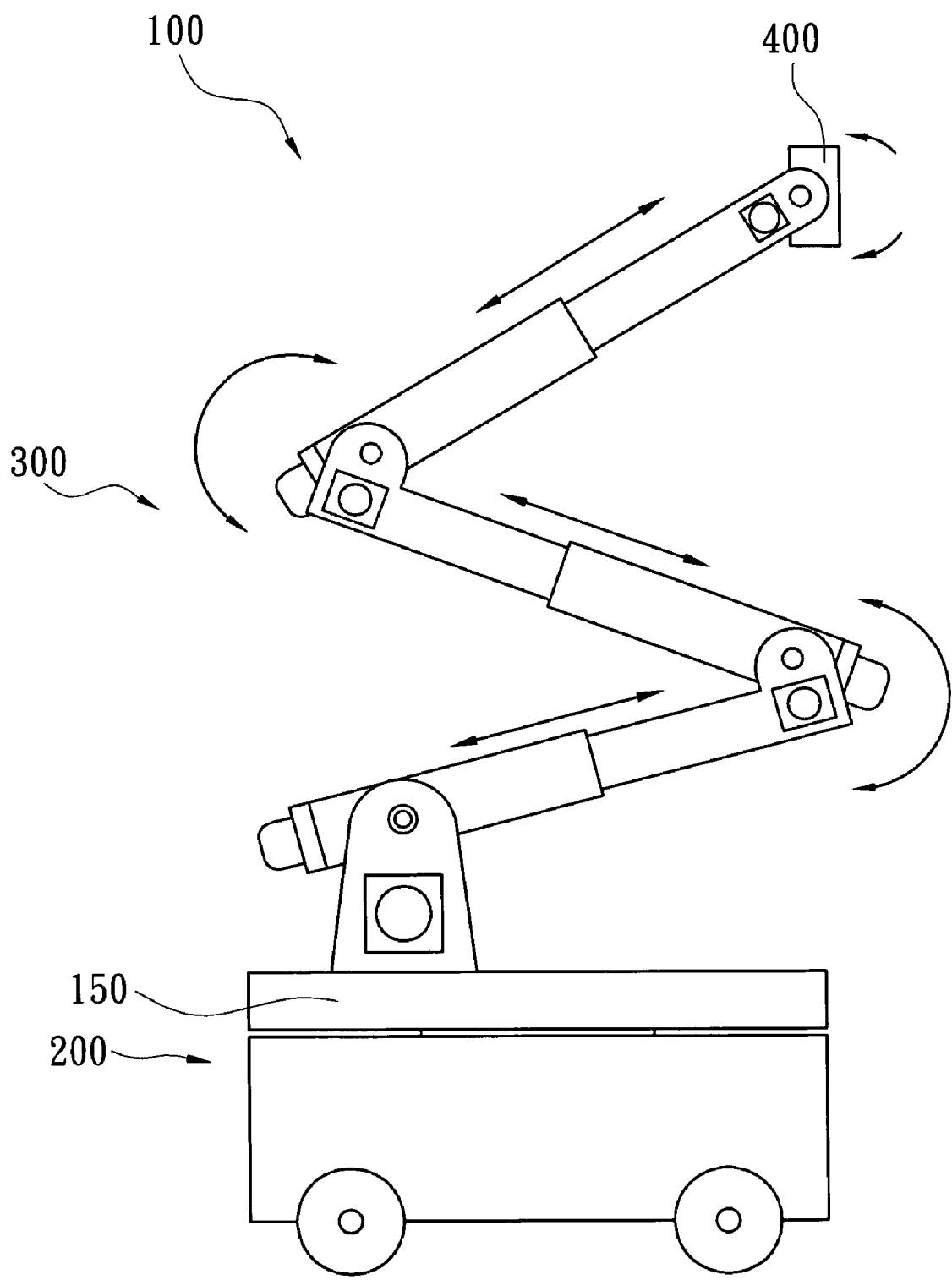
FIG. 1 is a schematic side view of an embodiment of a device for retrieving data from RFID tags in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. A device for retrieving data from radio frequency identification (RFID) tags 100 includes a mobile base 200, a robotic arm 300 and a data-reading device 400. The mobile base 200 includes a rotating platform 150 which could rotate 360 degrees. The robotic arm 300 is securely attached to the rotating platform 150 and is pivotally connected to the mobile base 200 through a shaft member. The data reading device 400 is attached to one end of the robotic arm 300 to retrieve data from RFID tags.

Figure 2:
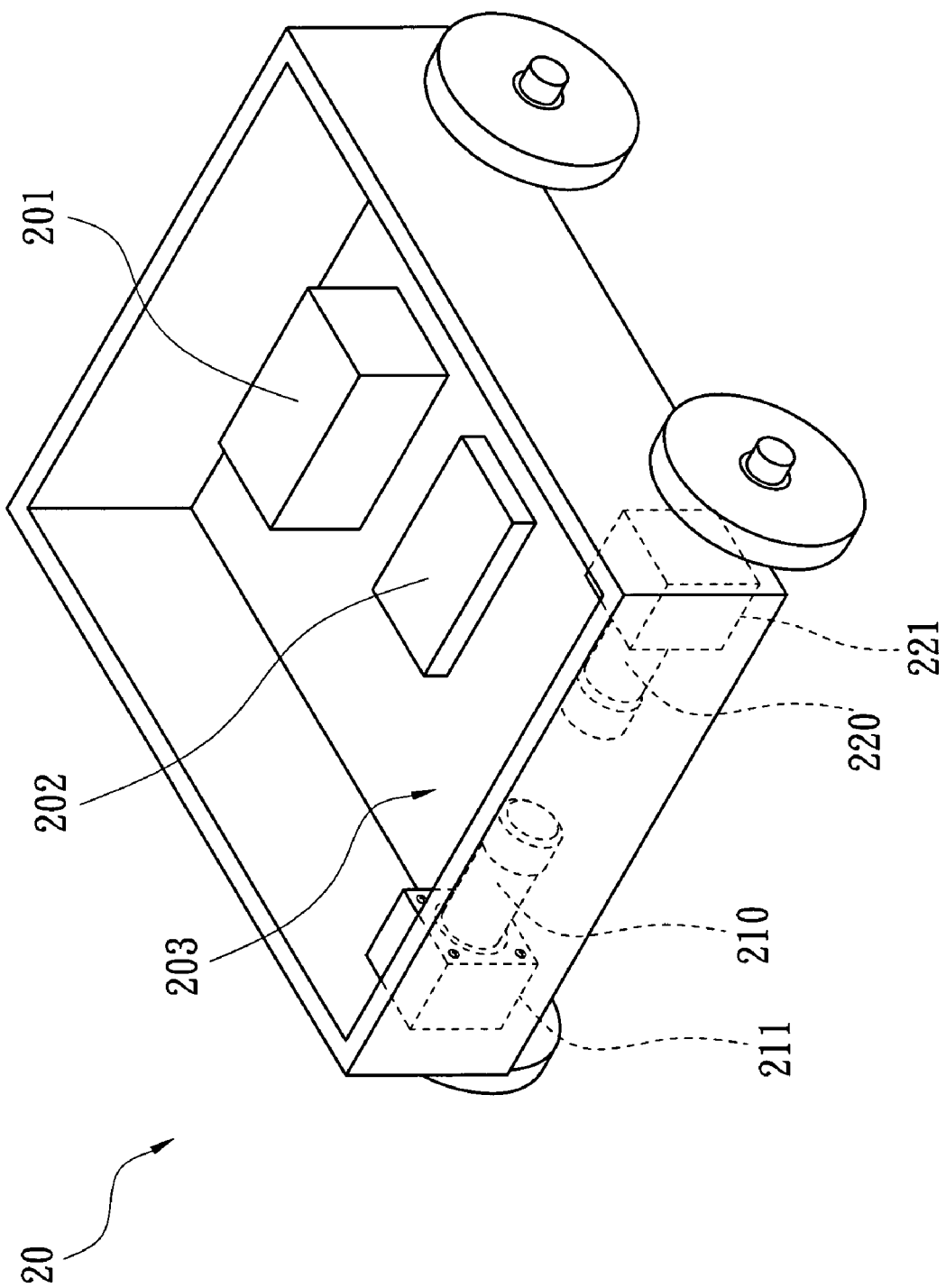
FIG. 2 is a perspective view of a mobile base in FIG. 1.

Refer to FIG. 2. In the present embodiment, a programmable mobile device is used to be an exemplary embodiment of the mobile base 200, and is explained below. The programmable mobile device 20 includes an electrical energy storage device 201, a microcomputer device 202 and a driving device 203.

The electrical energy storage device 201 provides power for the device 100 and all electrical devices thereof. The microcomputer device 202 controls the various components comprising the mobile base 200 and the robotic arm 300. The microcomputer device 202 functions depending on the written program. The driving device 203 includes a first driving motor 210 and a second driving motor 220 depending on the output signals from the microcomputer device 202 to work.

Refer to FIG. 1 and FIG. 2. The programmable mobile device 20 could move on a track system or on a supporting surface. The programmable mobile is device 20 could be an automatic vehicle or an anthropomorphous machine (so-called robot). The device 100 is controlled by a program built in the programmable mobile device 20, i.e. moving, rotation, height control and so on. A wired control or a remote control can also control the device 100. The data reading device 400 is a reader which transmits power and signals to RFID tags by radiowave.

According to an embodiment of the present invention, the electrical energy storage device 201 includes a charge device and a battery. The charge device is connected to a power source (like AC 110V or 220V) and transfers the power source from alternating current into direct current. The charge device charges the battery or transmits the power source to the device 100 directly. The microcomputer device 202 is programmable with computer program language such as C language or C++ object-oriented programming language. The first driving motor 210 and the second driving motor 220 are DC servo motors, and drive wheels through transmission mechanisms 211, 221 separately.

After the driving device 203 receives the control signals from the microcomputer device 202, the driving device 203 transforms the control signals into a driving signal through a driving circuit (not shown in the FIG. 2). The first driving motor 210 and the second driving motor 220 are controlled by the driving signal separately so that the programmable mobile device 20 could move forward, back, right and left.

In an embodiment of the present invention, the programmable mobile device 20 moves forward on the supporting surface through the first driving motor 210 and the second driving motor 220 rotating forward at the same time. The programmable mobile device 20 moves back on the supporting surface through the first driving motor 210 and the second driving motor 220 rotating reverse at the same time.

The programmable mobile device 20 turns right on the supporting surface through the first driving motor 210 rotating forward and the second driving motor 220 rotating reverse at the same time. The programmable mobile device 20 turns left on the supporting surface through the first driving motor 210 rotating reverse and the second driving motor 220 rotating forward at the same time.

Figure 3:
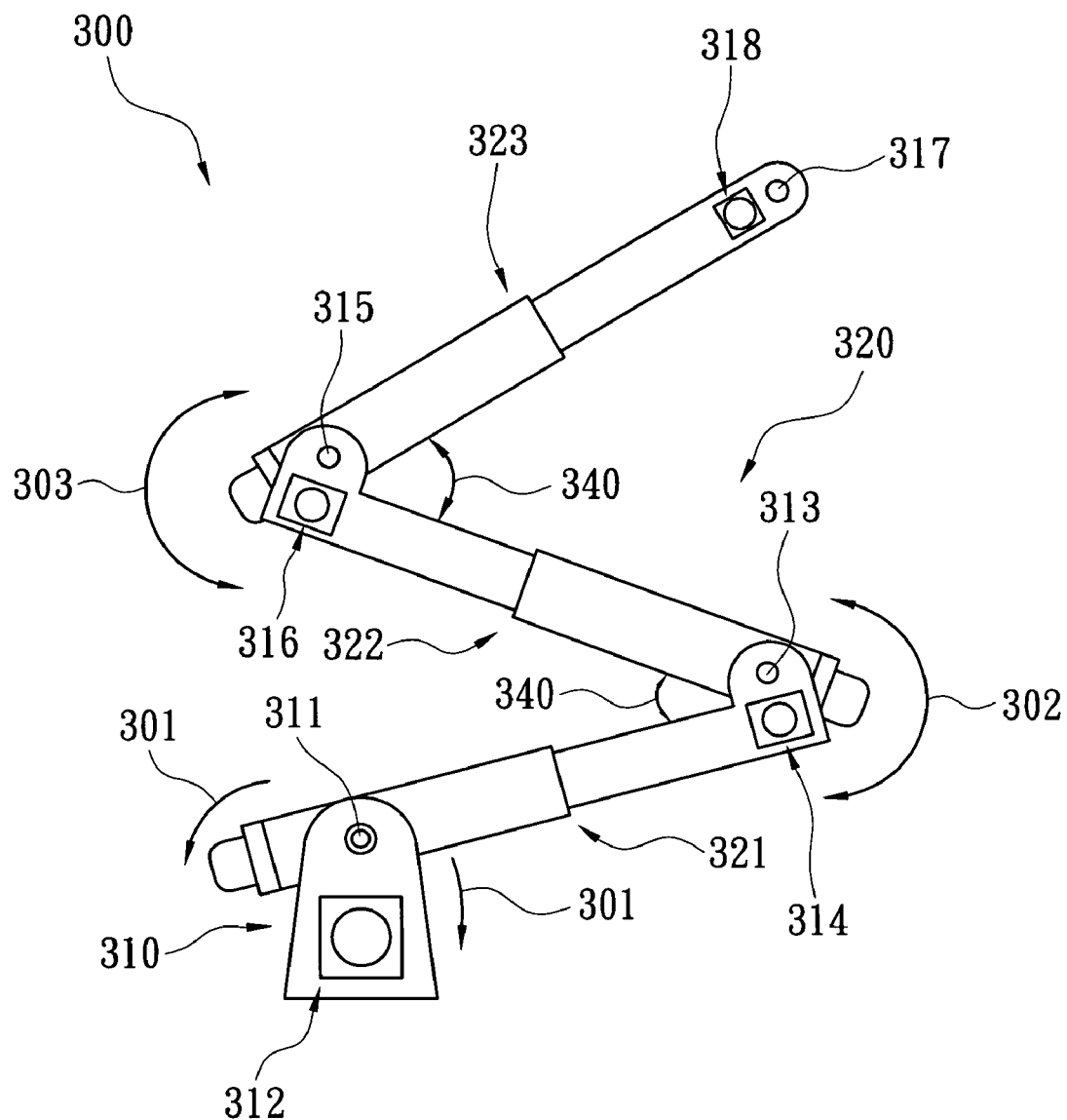
FIG. 3 is a schematic side view of a robotic arm in FIG. 1.

In FIG. 3, the robotic arm 300 includes a mounting base 310 and an arm device 320. The arm device 320 is pivotally mounted on the mounting base 310 and has a plurality of telescopic devices 321, 322, 323. In an embodiment of the present invention, the arm device 320 uses three telescopic devices explained below. The arm device 320 includes a first telescopic device 321, a second telescopic device 322 and a third telescopic device 323.

One end of the first telescopic device 321 is pivotally mounted to the mounting base 310 at a first joint portion 311. A first rotating device 312 rotates the first telescopic device 321 relative the first joint portion 311. Through the pivotal connection to the first joint portion 311, the first telescopic device 321 selectively rotates within a range of 0 degrees to 180 degrees relative the horizontal axis as denoted by the arrow 301 shown in FIG. 3.

One end of the second telescopic device 322 is pivotally connected to the end of the first telescopic device 321 at a second joint portion 313. A second rotating device 314 rotates the second telescopic device 322 relative to the second joint portion 313. Through the pivotal connection to the second joint portion 313, the second telescopic device 322 selectively rotates within a range of 0 degrees to 270 degrees as denoted by the arrow 302 shown in FIG. 3.

One end of the third telescopic device 323 is pivotally connected to the second telescopic device 322 through a third joint portion 315. A third rotating device 316 rotates the third telescopic device 323 relative to the third joint portion 315. Through the pivotal connection to the third joint portion 315, the third telescopic device 323 selectively rotates within a range of 0 degrees to 270 degrees as denoted by the arrow 303 shown in FIG. 3.

The data reading device 400 is pivotally attached to the other end of the third telescopic device 323 at a fourth joint portion 317. A fourth rotating device 318 rotates the data reading device 400 relative to the fourth joint portion 317 so that the data reading device 400 could change the angle while retrieving data. The data reading device 400 adjusts the reading angle through the fourth rotating device 318 and hence the angle of retrieving data is variable in order to get a better signal strength between the data reading device 400 and RFID tags when both are vertical.

Each rotating device 312, 314, 316, 318 has a driving motor and a transmission mechanism. The driving motors are a motive force source, which drive components coupled with each rotating device through transmission mechanisms. An included angle 340 between two telescopic devices is variable through controlled driving motors to drive the joint portion of coupled portion for rotation. In an embodiment of the present invention, the driving motors could be DC servo motors or AC servo motors, and the transmission mechanisms are speed reduction devices.

Figure 4:
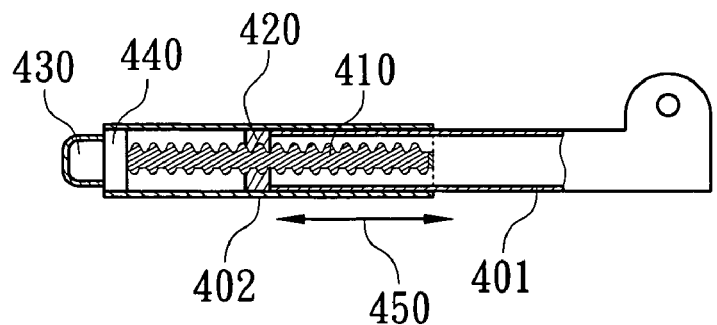
FIG. 4 is a sectional view of one of arm device in FIG. 3.

In FIG. 4, each telescopic device 321, 322, 323 has an upper arm 401 and a lower arm 402. The lower arm 402 comprises a screw rod 410, a sliding block 420, a driving motor 430 and a transmission device 440. The driving motor 430 is coupled with the transmission device 440, and rotates the screw rod 410 through the transmission device 440, which enables the sliding block 420 to move along the screw rod 410. The sliding block 420 moves in the direction denoted by the arrow 450 shown in FIG. 4 so that the telescopic device could adjust its length.

The upper arm 401 is connected to the sliding block 420 so the length of the upper arm 401 and the lower arm 402 is adjustable to be long or short depending on the sliding block 420 moving. In an embodiment of the present invention, the driving motor 430 could be a DC servo motor or a AC servo motors, and the transmission device are speed reduction devices.

Figure 5:
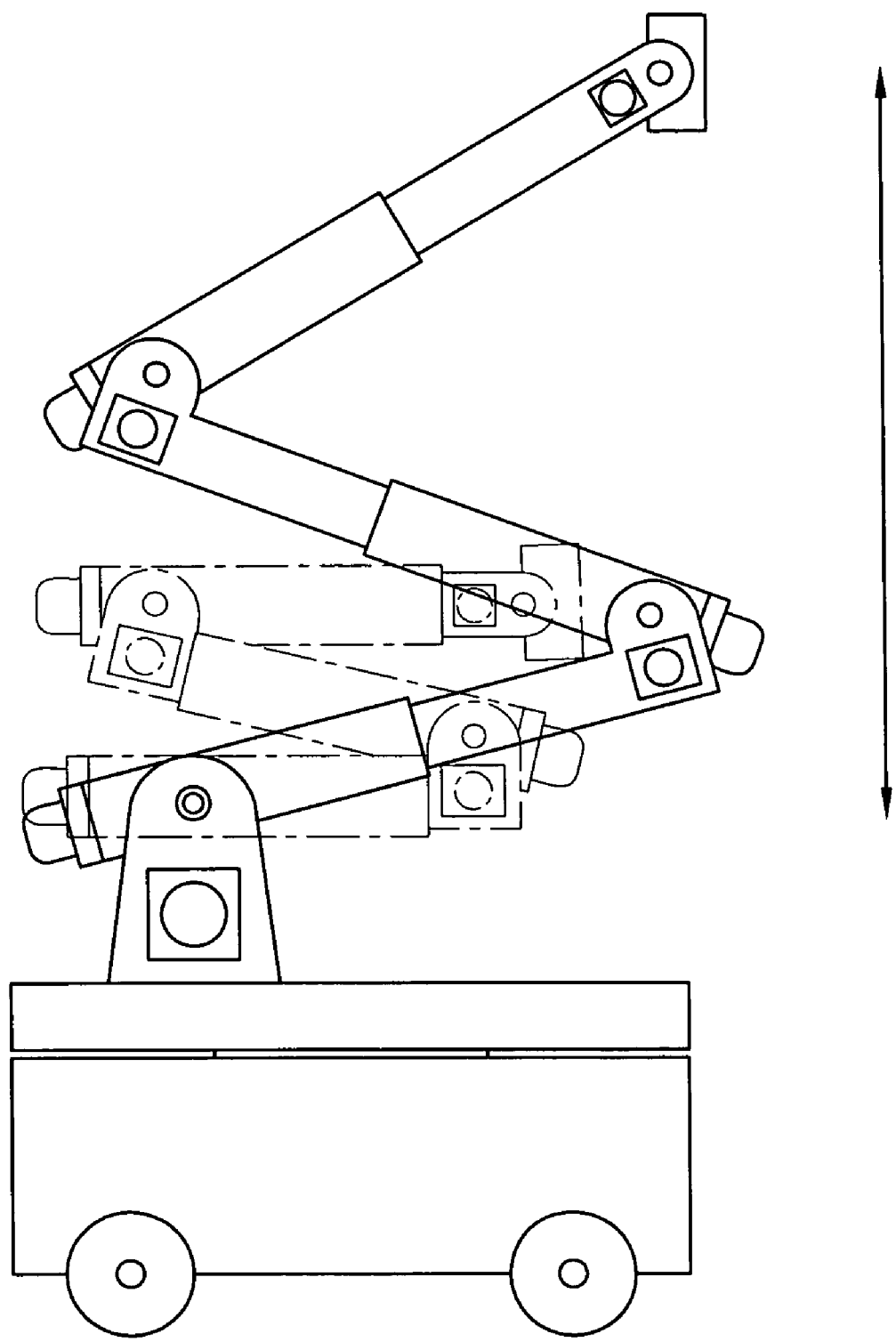
FIG. 5 is a schematic side view illustrating the movement of an embodiment of a device for retrieving data from RFID tags in accordance with the present invention.

In FIG. 5, each rotating device 312, 314, 316, 318 and each telescopic device 321, 322, 323 is controlled by the microcomputer device 202 so the height of the robotic arm device 300 is changed to get a better signal strength according to the position of RFID tags.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for retrieving data from radio frequency identification tags, and the device comprising:
    a mobile base;
    a robotic arm mounted on the mobile device and the robotic arm having
        a mounting base mounted on the mobile base; and
        an arm device pivotally mounted on the mounting base and rotated by a first rotating device relative to the mounting base, and the arm device having a second rotating device; and
    a data reading device attached to the second rotation device of the arm device.

2. The device for retrieving data from radio frequency identification tags of claim 1, wherein the mobile base includes a rotating platform which rotates within a range of 0~360 degrees, and the mounting base is mounted on the rotating platform.

3. The device for retrieving data from radio frequency identification tags of claim 2, wherein the mobile base is a programmable mobile device having a microcomputer device to control the programmable mobile device, the rotating platform, the robotic arm and the data reading device.

4. The device for retrieving data from radio frequency identification tags of claim 3, wherein the programmable mobile device further includes an electrical energy storage device electrically connected to the programmable mobile device, the robotic arm and the data reading device to provide power.

5. The device for retrieving data from radio frequency identification tags of claim 4, wherein the electrical energy storage device includes a charge device and a battery, and the charge device is connected to a power source to charge the battery.

6. The device for retrieving data from radio frequency identification tags to of claim 5, wherein the programmable mobile device includes a driving device having a first driving motor and a second driving motor through a transmission mechanism to output power respectively.

7. The device for retrieving data from radio frequency identification tags of claim 6, wherein the arm device includes a plurality of telescopic devices, and each telescopic device is connected to each other sequentially.

8. The device for retrieving data from radio frequency identification tags of claim 7, wherein a joint portion is mounted between each pair of connected telescopic devices, and includes a third rotating device.

9. The device for retrieving data from radio frequency identification tags of claim 8, wherein each third rotating device includes a third driving motor and a first transmission mechanism, and the third driving motor is coupled with the first transmission mechanism to drive the third rotating device.

10. The device for retrieving data from radio frequency identification tags of claim 9, wherein each telescopic device includes an upper arm and a lower arm, and the upper arm is telescopically mounted on the lower arm.

11. The device for retrieving data from radio frequency identification tags of claim 10, wherein the lower arm includes a screw rod, a sliding block, a fourth driving motor and a second transmission mechanism, and the fourth driving motor is coupled with the second transmission mechanism to rotate the screw rod, and the sliding block is movably mounted on the screw rod and the upper arm is connected to the sliding block.

12. The device for retrieving data from radio frequency identification tags of claim 11, wherein the data reading device is a reader of radio frequency is identification.

13. The device for retrieving data from radio frequency identification tags of claim 12, wherein the first driving motor, the second driving motor, the third driving motor and the fourth driving motor are a direct current servo motor, respectively.

14. The device for retrieving data from radio frequency identification tags of claim 12, wherein the first driving motor, the second driving motor, the third driving motor and the fourth driving motor are an alternating current servo motor, respectively.

* * * * *